April 7, 1964 J. S. CHANDLER 3,128,027
SHUTTLE, GATE, AND POSITION PIN ASSEMBLY FOR
MOTION PICTURE FILM PRINTERS
Filed April 17, 1961 4 Sheets-Sheet 4
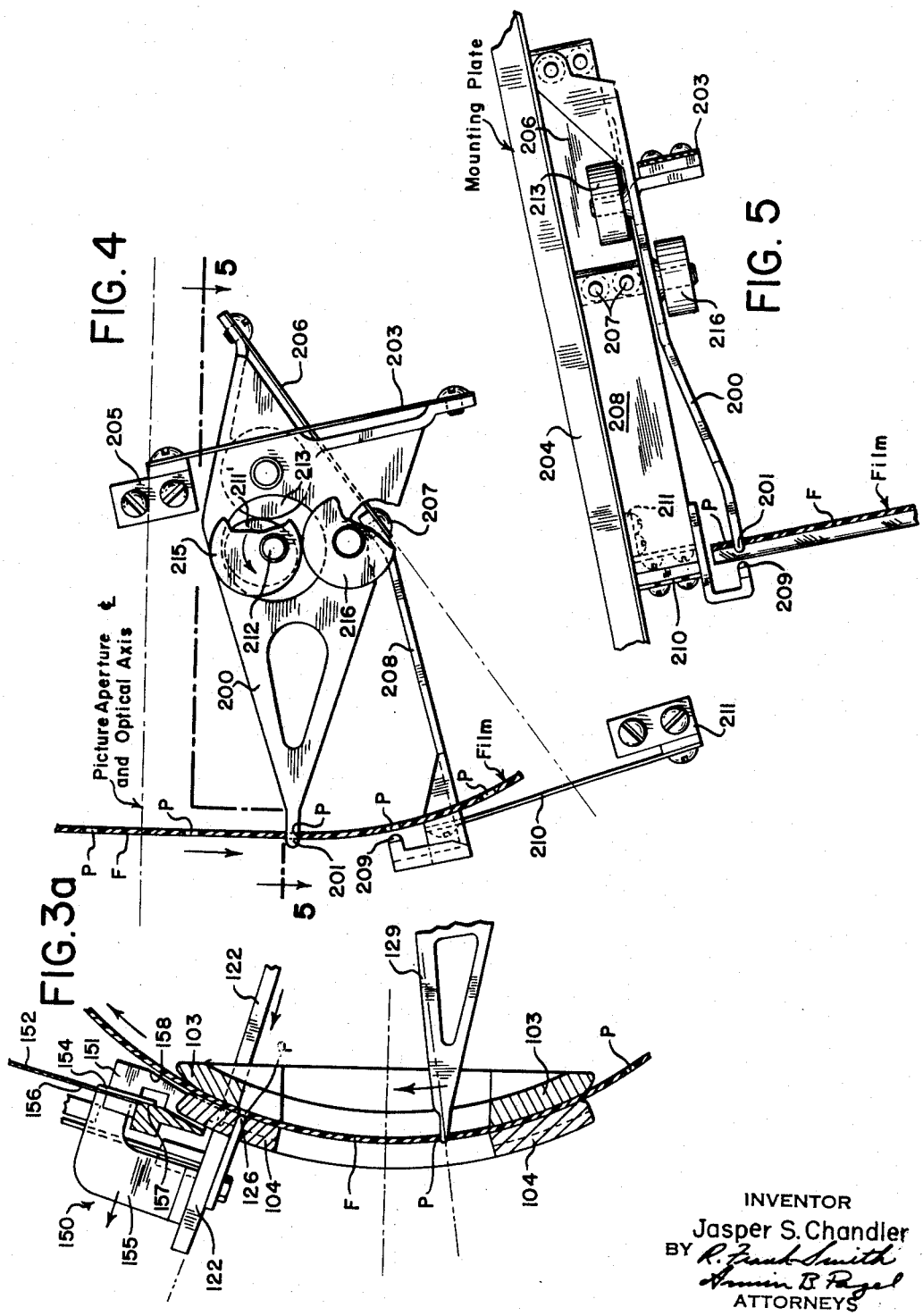
INVENTOR
Jasper S. Chandler
BY
ATTORNEYS

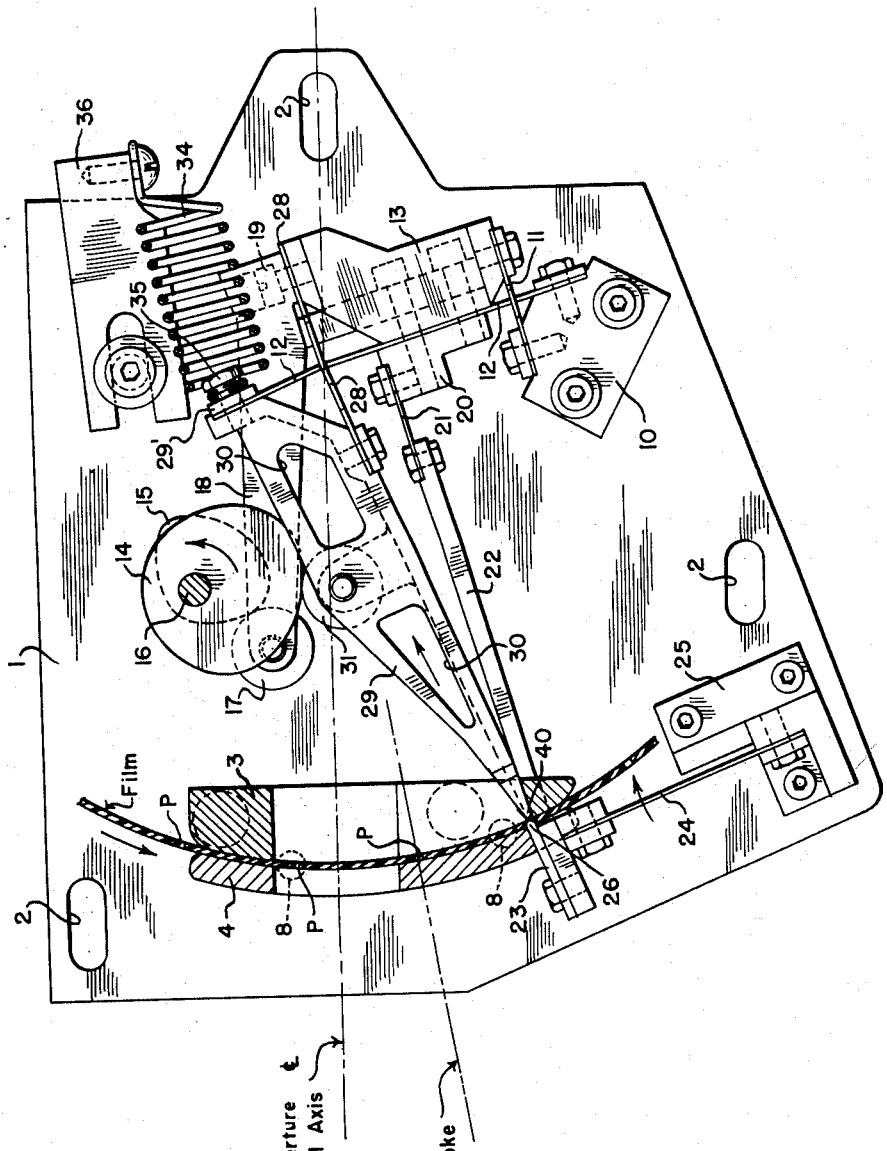

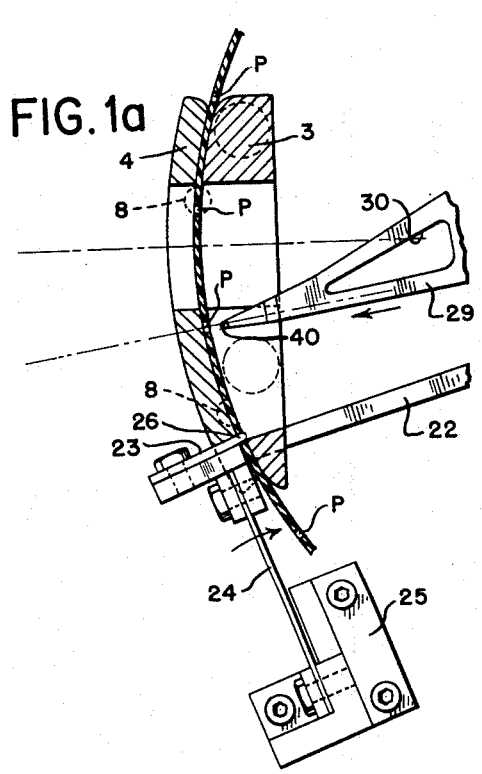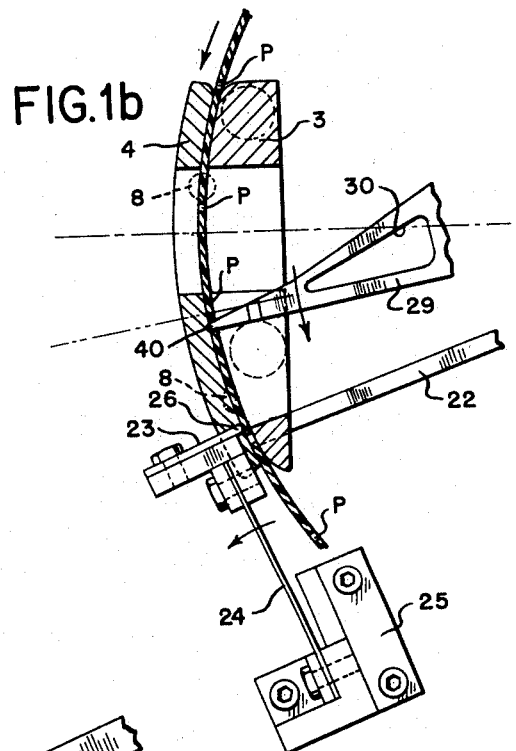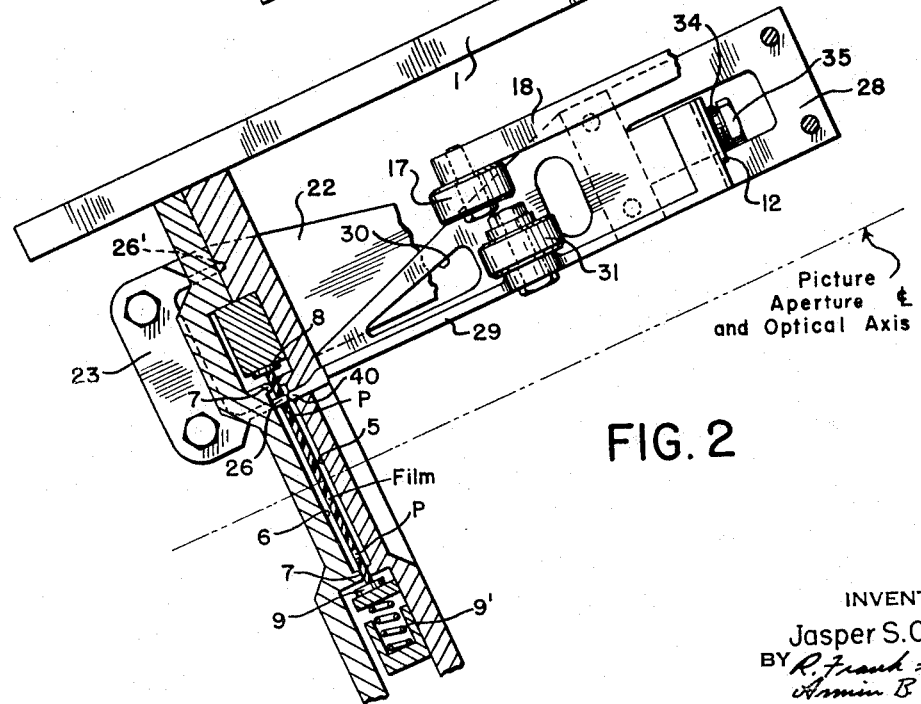

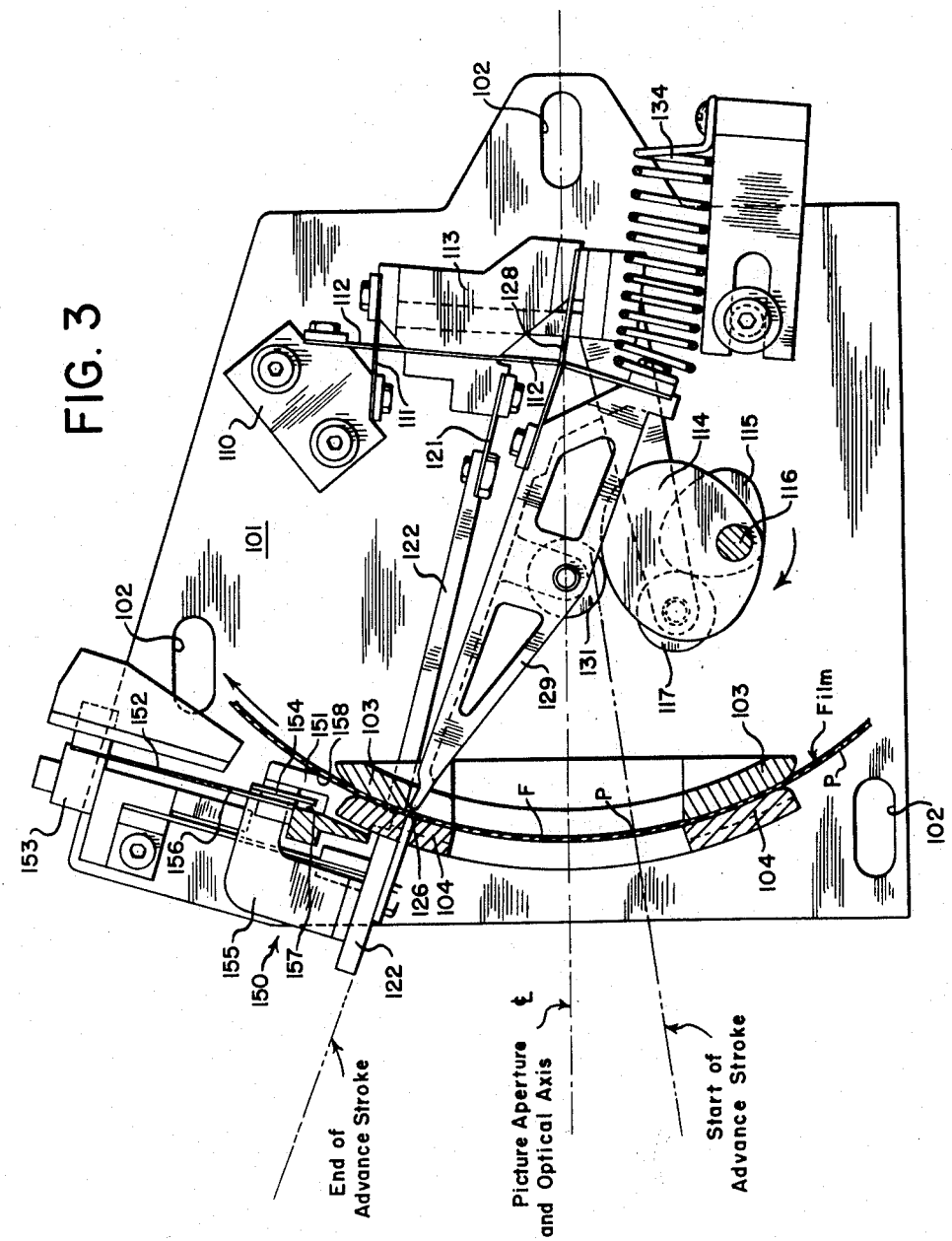

United States Patent Office 3,128,027
Patented Apr. 7, 1964

3,128,027
SHUTTLE, GATE, AND POSITION PIN ASSEMBLY
FOR MOTION PICTURE FILM PRINTERS
Jasper S. Chandler, Rochester, N.Y., assignor to Eastman Kodak Company, Rochester, N.Y., a corporation of New Jersey
Filed Apr. 17, 1961, Ser. No. 103,415
14 Claims. (Cl. 226—57)

This invention relates to a shuttle, gate, and position pin assembly for film printers and cameras and more particularly to an assembly whereby accurate positioning of the film in the gate is achieved under all operating conditions.

Motion picture film printers can be broadly classified as continuous motion picture printers or as intermittent motion or step printers. In continuous printers, both the master or negative film and the production or positive film copy are run through the printer continuously, while in step printers there is an intermittent motion wherein both the master and production films are stopped while each frame of the production film is copied from the master. Both continuous and step printers may further be classified as either optical or contact printers. In optical printers, light is passed through the master and onto the production film so as to expose it while in contact printers, the master actually contacts the production film to make the copy. Optical printers have an advantage over contact printers in that the size of the production film can vary from that of the master so that, for example, 16-mm. prints may be made from 35-mm. masters.

It is recognized in the art that step printers provide better picture definition and steadiness than continuous printers because both the master film, from which the copy is being made, and the undeveloped strip of film are stationary and can, therefore, have no relative motion during the exposure of each frame. Further, by using step printers, it is possibe to design the printer so that it uses the same type of frame registration and edge guiding means on the master film as was used when the master film was exposed in the camera. This consistency tends to cancel any unsteadiness caused by errors in perforating and slitting of the film. Continuous printers, on the other hand, must be continuously adjusted for varying pitch length of the film resulting from shrinkage, and cannot, in general, provide consistent registration. A further disadvantage of such continuous printers, in addition to errors due to inaccurate location of the perforations in the film, is that any error in the spacing of the sprocket teeth will also result in unsteadiness.

Conventional step printers have, however, been too slow for economical use as release printers if a large number of prints are to be made and have generally been reserved for the production of intermediate masters and the combination of scenes, masking, and other "trick" operations. Further, the means for advancing the film through the printer have been complicated and have entailed the use of bearings which are subjected to wear and the use of oil as a lubricant which often dripped on the film.

I propose to overcome the aforementioned difficulties attendant with conventional step printers by providing for a novel shuttle mechanism capable of high speeds which may be used in printing large numbers of release copies when applied to a printer while retaining the advantages of maximum definition and steadiness possible in intermittent printing, and when applied to a camera, may insure proper positioning of the film in the camera during exposure of each frame.

It is an object of my invention to provide a shuttle mechanism in which the exposure time for each frame may be as much as 50 percent of the total cycle time taken from the time that a frame is moved into the gate and out of the gate of the printer. Most continuous printers have an effective relative exposure time which is less than 50 percent of the cycle time in order to avoid loss of definition due to relative motion between the master and production films. Therefore, if the printing rate is limited by the film speed and printer light intensity, which is often the case with color films, the maximum printing rate when using my novel step printer may well be higher than for a continuous printer.

Further, it is an object of my invention to provide for a shuttle mechanism which may be used for a printer or camera having a curved gate. Where printers are used of the optical type, to either produce magnified or print pictures of the same size as the original, it is desirable that the gate not touch the film in the picture area since the film can be scratched. It is known that when the film is curved into the shape of a portion of a cylinder, the axis of which is perpendicular to the longitudinal direction of the film, stiffness will be imparted to the film so that it is not necessary that the gate touch the film in the picture area with the result that scratches in the picture area are avoided. It is well known that stiffness of thin materials and resistance of thin materials to outside disturbing forces can be increased in unsupported areas if the edges of the material conform to a cylindrical surface rather than to a plane surface. Disturbing forces tending to warp or buckle the film can be caused by humidity changes, solvent losses in the film or temperature differences between portions of the film.

In addition to imparting rigidity to the film and permitting accurate positioning of the film while contacting it only in the margin areas, the use of curved gates of the same radii for both the master film and the positive film copy (as disclosed in U.S. Patent 1,964,834 issued to R. Thun on July 3, 1934), enables copies to be made at various reduction ratios or of the same size as the master without the need for unconventional optical elements.

It is conventional practice in high quality camera equipment to use one or more position pins to accurately locate the film during exposure. The position pins are most effective if mounted in a rigid manner to the printer or camera body in order to resist disturbing forces in either the longitudinal direction of the film or lateral direction of the film with respect to film travel. It is desirable that the position pin does not have any allowable longitudinal movement in the direction of the film travel in order to insure accurate positioning of the film in the gate.

A further requirement for good position pin functioning is that the distance which the tapered portions of the pin is required to adjust the film position be at a minimum at all times. A serious fault existing in many conventional position pin designs is that the position pin enters perforation hole in the film which are at a considerable distance from the location of the driving teeth of the shuttle at the end of the shuttle's advance stroke. Variation in amount of film shrinkage will then cause a change in the amount of film adjustment required of the position pin. This situation becomes worse as large frame sizes are used and for a printer as compared to a camera because larger shrinkage ranges must be accommodated. In the invention to be described, the position pin enters the same perforation holes from the opposite side of the film which the driving teeth of the shuttle have vacated at the end of their advance stroke which completely eliminates film shrinkage effects upon position pin operation.

Many conventional printers apply pressure against the film by means of a spring pressing against a movable gate cover. However, this tends to scratch the film and also to cause an emulsion build up and undue gate wear. Still further, the pressure of the movable gate on the film results in an increase in friction which in turn requires a greater force to overcome in order to advance the film. This greater force, which is exerted by a shuttle pin in a perforation, often stretches the perforation resulting in the position pin not being able to accurately position the film in the gate. Attempts to mechanically lift the gate cover during film advance and to return it against the film during the exposure period have been impractical due to difficulties arising from high speed operation. It is therefore a further object of my invention, to provide for a novel film holding foot which may move in and out of contact with a film to prevent film motion while the position pin and advance pin are moving in and out of a perforation.

Broadly, I propose to use a novel arrangement of leaf springs by which a shuttle means having a shuttle or advance pin may be moved towards and away from the film so that the shuttle pin may engage a perforation on the film edge and by which the shuttle may be rotated in order to advance the film through the gate. The springs are supported by a mounting plate to which a curved gate is affixed. The device has a first rotatable cam for moving the shuttle means towards and away from the film and a second rotatable cam for rotating the shuttle so that the shuttle pin may advance the film forward through the gate. In addition, cam rotation means are provided for rotating the cams and cam followers are mounted on the shuttle means for engaging the cams.

The device in addition may include a position pin which intermittently engages the same perforations as engaged by the shuttle pin in order to hold the film in position when the shuttle pin is out of engagement with the film. The position pin is affixed to one end of a leaf spring which is in turn affixed to the mounting plate and the position pin is further connected to the shuttle means so that the pin is moved towards and away from the film as the shuttle means moves away from and towards the film.

My novel device may also include a film holding foot which is affixed to a leaf spring affixed to the mounting plate and which may be moved by the position pin so that the foot will engage the perforation area of the film to hold its against the gate during the period in which both the position pin and shuttle pin are moving in and out of a single perforation.

Referring to the drawings in which preferred embodiments of my invention are shown, FIG. 1 is a side sectional view of a film printer constructed according to my invention;

FIG. 1(a) is a portion of FIG. 1 illustrating the shuttle means moving towards the film and with the position pin engaged;

FIG. 1(b) is a view similar to FIG. 1(a) illustrating the shuttle means advancing the film through the gate and with the position pin disengaged;

FIG. 2 is a plan view of a portion of FIG. 1;

FIG. 3 is a side sectional view of a modified film printer used in printing large sized film and illustrating my novel film holding foot;

FIG. 3(a) is a partial view of FIG. 3 illustrating the shuttle pin in engagement with the film and advancing the film through the gate;

FIG. 4 is a side view of a shuttle pin and position pin assembly constructed according to my invention adapted for use with a camera; and FIG. 5 is a plan view of a portion of FIG. 4.

Referring to the figures in greater detail and in particular to FIG. 1, 1 illustrates a mounting plate of a film printer which may be affixed to a printer body by bolts through slots 2. A stationary gate 3 is affixed to the mounting plate 1 and has an arcuate surface the axis of which intersects the optical axis of the gate at right angles. A removable gate cover 4 is mounted on the stationary gate 3 and may be removed for threading and cleaning. The gate cover is provided with adjusting screws (not shown) and a spring (not shown) by means of which the film in the support zone near the edges of the gate is closely confined as it moves between the guide surfaces. Both parts 3 and 4 of the gate are recessed approximately 0.005 inch in central portons 5 and 6 as shown in FIG. 2 in order that the only contact between the film and gate will occur along the narrow margin areas 7 outside the perforation holes P on the edges of the film. By this construction, in which the perforation zones are excluded from the support area, damaged holes will not increase the drag force of the film or cause the cover to lift, and, further, a type of film splice can be used which presents single film thickness only in the margins and causes minimum disturbance of the film going through the gate.

Two sapphire buttons 8 are adjustably located at the back edge of the film for edge guide control. Directly opposite each back sapphire button is a spring-loaded front sapphire button 9 which is urged into contact with the film edge by means of spring 9' so that the film will at all times be centered.

A block member 10 is affixed to the mounting plate 1 and serves as a base for flat leaf springs 11 and 12 which extend substantially at right angles to each other. Flat leaf springs 11 and 12 in turn are fastened to a rocker member 13 so that the rocker member is free to pivot about the intersection of the planes of the springs 11 and 12. Spring 11 is of greater width than spring 12 and has a cutout therein through which spring 12 extends. The pivot axis thus formed by the intersection of the springs 11 and 12 may be considered as fixed in space the same as a rigidly mounted hinge.

This type of spring hinge differs from a conventional hinge in three important respects. First, there is no play in the spring hinge and no play can develop as a result of wear or loss of oil film; second, no lubrication is required and, therefore, maintenance is reduced and the danger of oil getting on the film or optical components and helping to attract dirt accumulations is minimized; and, third, the springs do not create a friction torque and do produce a restoring torque proportional to the angle of displacement from the neutral position or zero stress position. In actual practice, this restoring torque has no detrimental effects and can actually be used to tune assemblies to the fundamental component of the acceleration torque at operating speed of the printer. The spring length and thickness must be chosen to keep the operating stress well below the endurance limit of the spring material.

An advance cam 14 and an in-out cam 15 are mounted on a rotatable drive shaft 16 rotated by drive means in the direction shown. A follower 17 contacts cam 15 and is rotatably mounted on the end of an arm 18 which in turn is attached to rocker 13 by means of screw 19. As the shaft 16 rotates in the direction shown, the arm 18 and rocker 13 are caused to oscillate about the pivot axis formed by the intersection of springs 11 and 12.

A clamp 20 holds the spring 12 against the rocker 13 and also secures an end of a spring 21 to the rocker 13. The other end of spring 21 is attached to a position pin arm 22 which carries on the end thereof a position pin plate 23 and which is supported by a flat spring 24 attached to the mounting plate 1 by means of a bracket 25. The position pin plate 23 terminates in a position pin 26 which is shaped so as to be full fitting in the perforation holes P in the edge of the film in the up-and-down direction but not in the transverse direction. The plate 23 has a second projection 26' as shown in FIG. 2 which serves as a spare position pin and which can be used by merely turning the plate 23 over. The spring 24 serves as a rigid connection for the position pin 26 to the mounting plate 1 in the direction of film travel and thus promotes accurate registration of the film without being subjected to play, wear, oil variation, or flexure which results from the use of conventional pivot bearings.

The spring 12 is attached at its upper end to a shuttle arm 29 by means of a clamp 29'. Shuttle arm 29 also has attached thereto a flat leaf spring 28 which is connected at one end to the rocker 13 and provides a connecting link between the rocker and shuttle arm. Spring 28 has a cutout therein, as shown in FIG. 2, through which the spring 12 extends substantially perpendicular to form a further axis about which the shuttle may pivot. This pivot axis, formed by the intersection of springs 28 and 12, coincides with the center of curvature of the gate 3 when the in-out cam 15 is rotated to the full in position where a tooth 40 on the end of the shuttle arm completely engages with the perforations in the film and the position pin 26 is completely disengaged as shown in FIG. 1(b). It is desirable to make the shuttle arm 29 of a light-weight material such as aluminum which is coated at its pin end in order to prevent wear. The shuttle arm further is provided with cutouts 30 in order to further reduce weight and resulting high moments of inertia.

A cam follower 31 is rotatably mounted on the shuttle arm 29 and contacts the advance cam 14 in order that the correct motion may be imparted to the shuttle arm to advance the film through the printer.

A helical tension spring 34 is attached by means of a screw 35 to the shuttle arm 29 and also by means of a clamp 36 to the mounting plate 1. The purpose of helical spring 34 is to insure that the follows 31 and 17 will bear against their respective cams at all operating speeds. The stiffness in tension of this spring is carefully calculated in order to provide for only a slightly greater force than the minimum necessary to maintain follower contact.

The operation of the device may be seen by referring to FIGS. 1, 1(a), and 1(b). In FIG. 1, the shuttle arm 29 is shown in the position wherein the pin or tooth 40 has just left a perforation and is moving away from the film and wherein the position pin 26 has just entered the same perforation to position the film so that a frame is properly in place along the optical axis of the printer. As shaft 16 continues to rotate in the direction shown, the spring 34 will pull the shuttle arm 29 and follower 31 upwards against cam 14 until the arm is in the position as shown in FIG. 1(a) at which time the rise of cam 15 will rotate the rocker 13 about the intersection of springs 11 and 12 to cause the shuttle arm to move towards the film. As the shaft 16 continues to rotate, the shuttle arm 29 will move forward until the pin 40 engages a perforation while at the same time the position pin arm 22 will move towards the left to move the position pin out of a perforation as shown in FIG. 1(b). Further rotation of the shaft then rotates the shuttle arm about the intersection of spring 28 and 11 to advance the film through the gate until the parts again reach the position shown in FIG. 1.

The design of the cams is such that the film is stationary and correctly registered for a little over 180° of cam shaft rotation in order that a 180° cover blade on the shutter of the printer may be used. Further the cams are so designed as to give a minimum amplitude of the higher harmonic components and to reduce any overlap of in-and-out travel time of the assembly with the advance and return time of the assembly. Also the cam 14 is designed so that the start and ending of the advance stroke of the shuttle will have a minimum change in acceleration in order to avoid high harmonics in the film motion.

The printer shown in FIGS. 1 and 2 is particularly adaptable to 35-mm. film; however, it can be used with other film. It is preferable that when larger films are used, as for example 55-mm. film, two shuttle arms be utilized in order to compensate for the greater film width and higher velocity of the film through the printer. Where two shuttle arms are used, it is necessary that the device be constructed so that the shuttle arms straddle the aperture and it is further necessary when an optical printer is used, that none of the shuttle arms or drive components interferes with the passage of light passing through the picture aperture along the optical axis of the printer.

In FIGS. 3 and 3(a), I illustrate a slightly different embodiment of an optical film printer constructed according to my invention having in addition a film holding foot means for securing the film against vertical and lateral motion during the period when there is a transfer of control from the shuttle pin to the position pin and vice versa. The printer shown in FIG. 3, which is for use with 55-mm. film, has a base plate 101 which is mounted in the printer body by bolts through slots 102. A stationary gate portion 103 is attached to a removable gate cover 104 and both parts are recessed, as are the parts shown in the embodiment of FIG. 1, in order that the film is not contacted in the picture area. A block member 110 is mounted on the base plate 101 and serves as a mount for leaf springs 111 and 112 in a manner similar to that shown in FIG. 1. The springs 111 and 112 are attached to a rocker member 113 which has springs 121 and 128 attached to it and which are attached in turn to a position pin arm 122 and a shuttle arm 129 in the manner shown in FIG. 1. A shaft 116 has thereon an in-and-out cam 115 and an advance cam 114 which contact cam followers 131 and 117 respectively. A tension spring 134 insures that the cam followers remain in contact with the cam under all operating conditions.

Since the film is larger, the printer is provided with two shuttle arms, only one of which is shown. Both shuttle arms and their associated parts straddle the optical axis of the printer in order not to block passage of light. It is not necessary to include a sapphire guide means in this construction of my invention since one of the position pins 126 completely fills a perforation hole in a direction transverse to the film travel and thus serves to guide the film in a sidewise direction as is done in a camera. The operation of the film printer shown in FIG. 3 is substantially similar to that shown in FIG. 1 and with the main difference being that the shuttle arm advances the film in an upward direction rather than a downward direction.

In order that the film may be positioned during the transition period when the position pins and shuttle pins are moving in and out of the perforation holes, I provide for a film holding means denoted generally by 150 which comprises a movable pressure foot 151 which is urged towards the film by a flat spring 152 affixed to the mounting plate by clamp 153 to apply pressure on the film in substantially the perforation area to force it into contact with gate 103.

Pressure foot 151 is made of a light-weight fiber in order that the mass of the assembly is kept at a minimum. A lifter finger 154 is attached to an elbow 155 which in turn is connected to the position pin carrier arm 122. The lifter finger and elbow extend through a cutout 156 in the spring 152 and the finger is so adjusted that contact is made with the pressure foot at point 157 when approximately .02 inch of outward travel of the position pin carrier arm remains due to rotation of the in-and-out cam 115. Thus the pressure foot is lifted during the entire advance stroke of the shuttle and contacts the film in the perforation area at all other times to securely position the film in place. Because the mass of the system is kept low by the use of light-weight materials, high speeds of the device are obtainable.

In FIG. 3, the shuttle arm 129 is shown moving away from the film with the edge 158 of the foot engaging the area of the perforated edges of the film F to hold it securely against the gate 103. FIG. 3(a) illustrates the assembly wherein the shuttle arm is advancing the film through the gate and the film holding foot is held out of contact with the film by means of the lifter finger 154.

Reference is now made to FIGS. 4 and 5 which illustrate a simplified version of my novel shuttle means which, in addition to use with printers, has particular application to small cameras and projectors which require short strokes of the shuttle. Referring to FIG. 4, 200 is a shuttle arm having on the end thereof shuttle pin 201 for engaging perforations P of the film which passes through a camera or projector. The shuttle arm 200 in turn has affixed thereto a flat spring 203 which is connected to a mounting plate 204 by means of a clamp 205. A flat spring 206 is connected by rivets 207 to a position pin arm 208 which has on the end thereof a position pin 209. Also affixed to the position pin arm 208 is a third flat spring 210 which is connected to the mounting plate 204 by means of clamp 211. The shuttle arm 200 is thus supported in its entirety by springs 203 and 206 acting through the position pin arm 208 and spring 210.

An in-and-out cam 211' is mounted on a rotatable shaft 212 and engages a cam follower 213 rotatably mounted on the shuttle arm 200. An advance cam 215 is likewise mounted on shaft 212 and engages a cam follower 216 carried on the shuttle. As the shaft 212 is rotated, the cam 211' will cause the shuttle arm to move towards and away from the film while the cam 215 will cause the shuttle arm to advance to pull the film through the camera. The shuttle arm thus rotates about an axis formed by the intersection of springs 206 and 203 in a manner similar to that of the structure illustrated in FIG. 1. In addition, spring 203 allows the horizontal motion required for in-and-out travel of the shuttle arm 200.

The right end of position pin arm 208, at its point of attachment to spring 206 is generally free to move up and down. The forces transmitted through spring 206 as the shuttle moves may produce such motion and it is desirable, but not essential, that this motion be minimized. The vertical disturbances transmitted to arm 208 may be minimized if the imaginary extension of spring 206 intersects spring 210 at essentially the midpoint of the free length of spring 210 and if the plane of spring 203 intersects spring 206 at a point slightly to the right of the midpoint of its free length as shown in FIGS. 4 and 5.

It is necessary that position pin 209 have no component vertical motion while engaged with the film during the return stroke of the shuttle arm and during the time of film exposure. This may be achieved if the center line of spring 210 intersects position pin 209 at the point of film engagement when the position pin is fully positioned in the perforation. Any vertical motions of the right end of arm 208 will, therefore, not produce any vertical motion at pin 209.

The structure shown in FIGS. 4 and 5 differs from that shown in FIG. 1 in that all springs are in the zero stress position, that is, they are straight at the completion of the in stroke and at the start of the advance stroke of the shuttle; whereas in the structure shown in FIG. 1, each spring is allowed to deflect an equal amount on either side of its neutral or zero position. Thus all motions of the cams shown in the structure in FIGS. 4 and 5 produce uni-directional stresses only and always in the direction of increased follower loading. It is possible to prestress the springs so that they never in fact reach zero stress in the operating cycle of the shuttle. This is particularly desirable for spring 210 in order to produce good action of the shuttle as it enters the film perforation. Therefore, it is seen that by the use of flat springs and taking in consideration the maximum speed of operation of the camera and the permitted stress limits for long operation, the followers 216 and 213 can be made to be kept in contact with the cams at all times without the need of an auxiliary spring such as springs 34 and 134 shown in FIGS. 1 and 3.

No lateral film guide means are shown in the embodiments of FIGS. 4 and 5. However, fixed buttons could be located in the camera opposite the perforations at the position pin area and at the top of the picture aperture with spring loaded buttons located in corresponding positions at the front edge of the film similar to the guide buttons shown in FIG. 1.

In addition to simplicity of structure, the embodiment of FIGS. 4 and 5 provides the advantages of increased stiffness which a rigidly mounted position pin gives and which a pivot axis free of fluctuation, play, and wear can provide.

While the various embodiments of my invention are shown in the drawings as utiliziing curved gates, it is obvious that by a change in cam design, the shuttle arm and mounting, the shuttle arm could be adapted for use with printers and cameras having a straight film path through the gate or aperture.

Having described my invention, what I claim is:

1. A film advancement device for a film using apparatus having a gate comprising a mounting plate, a shuttle means having a shuttle tooth mounted at one end thereof for intermittently engaging perforations on a film edge, at least two flat springs the planes of which intersect supporting said shuttle means with the intersection of the planes of said springs forming a pivot point about which said shuttle means may pivot, a first rotatable cam for moving said shuttle means towards and away from said gate to move said shuttle pin intermittently into and out of engagement with perforations in said film, a second rotatable cam for rotating said shuttle means about said pivot point to intermittently advance said film through said gate, cam rotation means for rotating said first and second cams, and cam followers operatively associated with said shuttle means engaging said first and second cams.

2. A film advancement device according to claim 1 having in addition a position pin for intermittently engaging the same perforations in said film as engaged by said shuttle pin in order to position said film in said gate when said shuttle pin is out of engagement with said film; said position pin being connected to said shuttle means so as to move towards and away from said film when said shuttle means moves towards and away from said gate and said position pin being further connected to one end of a flat spring extending normal to the in-and-out movement of said shuttle and being fixed at its other end to said mounting plate.

3. A film advancement device according to claim 2 having in addition a film holding foot affixed to a leaf spring one end of which is mounted on said mounting plate, foot moving means connected with said position pin to intermittently move said foot into and out of engagement with said film to intermittently force said film against a portion of said gate.

4. A film advancement device for a film using means having a gate comprising a mounting plate, a movable shuttle arm having a shuttle pin at one end thereof for intermittently engaging perforations in said film to move said film through said gate, a first flat spring extending substantially parallel to the travel of said film through said gate affixed at one of its ends to said mounting plate and at the other of its ends to said shuttle arm, a second flat spring affixed to said arm, the plane of said second spring intersecting the plane of said first spring to form a pivot point about which said shuttle arm may rotate, an in-and-out cam follower mounted on said shuttle arm, and advance cam follower mounted on said shuttle arm, an in-and-out cam mounted on a rotatable drive shaft, an advance cam mounted on said rotatable drive shaft, and drive means for rotating said drive shaft; said drive shaft when rotated by said drive means causing said in-and-out cam to move said in-and-out cam follower and shuttle arm towards and away from said film to intermittently position said pin in a perforation, and causing said advance cam to rotate said advance cam follower and shuttle arm about said pivot point to intermittently advance said film through said gate.

5. An optical film printer comprising a mounting plate, a curved gate through which film may pass, a shuttle arm having a shuttle pin at one end for engaging perforations in said film, a first leaf spring affixed at one of its ends to said shuttle arm and at the other of its ends to said mounting plate, a second flat leaf spring affixed at one of its ends to said shuttle arm and at the other of its ends to a rocker with the planes of said first and second springs intersecting to form a first pivot axis about which said shuttle arm may rotate, a third flat spring extending substantially parallel to said second flat spring affixed at one of its ends to said rocker and at the other of its ends to said mounting plate with its plane intersecting the plane of said first spring to form a second pivot axis about which said rocker may rotate, an advance cam follower mounted on said shuttle arm, an in-and-out cam follower mounted on said rocker, a rotatable drive shaft, and an in-and-out cam and an advance cam both mounted on said drive shaft; said drive shaft when rotated causing said in-and-out cam follower to rotate said rocker about said second pivot axis to move said shuttle arm away from and towards said film and causing said advance cam follower to rotate said shuttle arm about said first pivot axis to advance said film through said gate.

6. A film printer according to claim 5 having in addition a position pin arm connected at one end to said rocker, a position pin on the end of said position pin arm for intermittently engaging perforations in said film, and a fourth flat spring extending substantially parallel to said spring affixed at one of its ends to said position pin arm and at the other of its ends to said mounting plate; said position pin being moved in and out of a perforation by said position pin arm in a direction normal to the film when said in-and-out cam rotates said rocker about said second pivot axis.

7. An optical film printer comprising a curved gate through which film may pass, at least one shuttle arm having a shuttle pin at one end thereof with the other end of each arm supported by first and second flat springs the planes of which intersect to form a first pivot axis about which each said shuttle arm may rotate, said first spring being affixed at one of its ends to said mounting plate, a rocker affixed to said second spring, a third flat spring affixed to said mounting plate and to said rocker, the planes of said first and third flat springs intersecting to form a second pivot axis about which said rocker may rotate, advance cam means for rotating said rocker about said first pivot axis to advance said film through said gate, in-and-out cam means for rotating said rocker about said second pivot axis to move said rocker towards and away from said film, a position pin arm connected to said rocker, a position pin mounted on the end of said position pin arm for engaging a perforation in said film as said rocker is rotated about said second pivot axis, and a fourth flat spring affixed to said position pin arm and to said mounting plate to restrict movement of said position pin in a direction usbstantially normal to said film.

8. An optical film printer according to claim 7 having in addition a foot holding means comprising a channel-shaped holding foot for intermittently forcing the perforation area of the film into contact with said gate, spring means for urging said foot into engagement with said film, a lifter means mounted on said position pin arm for intermittently lifting said foot off said film when said position pin is withdrawn from a perforation and when said shuttle pin engages a perforation to allow film to be advanced through said gate.

9. A film advancement means for a film using device having a gate, a shuttle arm having a shuttle pin at one end thereof for intermittently engaging said film and advancing it through said gate, a first flat spring affixed to said shuttle arm at one of its ends and at the other of its ends to a mounting plate, a second flat spring affixed at one of its ends to said shuttle arm with the other of its ends supported on said mounting plate by a support means, the planes of said first and second flat springs intersecting to form a pivot axis about which said shuttle arm may rotate, and advance means for rotating said shuttle arm about said pivot axis to advance film through said gate and an in-and-out means for intermittently moving said shuttle pin in and out of perforations on said film.

10. A film advancement device according to claim 9 wherein said advancement means comprises a rotatable drive shaft, an advance cam mounted on said drive shaft, an advance cam follower mounted on said shuttle arm engaging said advance cam, and said in-and-out means comprises an in-and-out cam mounted on said drive shaft and an in-and-out cam follower mounted on said shuttle arm engaging said in-and-out cam.

11. A film advancement device according to claim 9 wherein said support means for supporting said second spring on said mounting plate comprises a position pin arm connected at one of its ends to said second spring, and a third flat spring connected at one of its ends to said position pin arm and affixed at the other of its ends to a mounting plate; said third flat spring extending substantially parallel to said first flat spring and perpendicular to said position pin arm with the plane of said second flat spring intersecting said third flat spring at approximately its midpoint.

12. A film advancement device according to claim 11 having a position pin affixed to the end of said position pin arm for intermittently engaging a perforation on said film; said position pin being limited by said third flat spring to travel only in a direction substantially normal to said film at a point where said position pin engages a perforation in said film.

13. A film advancement device according to claim 12 wherein said springs are in a neutral unstressed condition when said position pin is completely in a perforation and at the beginning of an advance stroke of said shuttle to advance film through said gate.

14. An intermittent film feed mechanism comprising a support member; a rocker member; a first pair of intersecting leaf springs connecting said rocker member to said support member to move about a first pivot point defined by the intersecting planes of said two springs; a shuttle member; a second pair of intersecting leaf springs connecting said shuttle member to said rocker member to move about a second pivot point defined by the intersecting planes of said second pair of springs; means for reciprocally moving said rocker member about said first pivot point; and means for reciprocally moving said shuttle member about said second pivot point.

References Cited in the file of this patent
UNITED STATES PATENTS
1,305,002    Oiler _____ May 27, 1919

UNITED STATES PATENT OFFICE
CERTIFICATE OF CORRECTION

Patent No. 3,128,027                                    April 7, 1964

Jasper S. Chandler

It is hereby certified that error appears in the above numbered patent requiring correction and that the said Letters Patent should read as corrected below.

Column 9, line 26, after "said", first occurrence, insert -- first --.

Signed and sealed this 18th day of August 1964.

(SEAL)
Attest:

ERNEST W. SWIDER
Attesting Officer

EDWARD J. BRENNER
Commissioner of Patents